Figure 1:
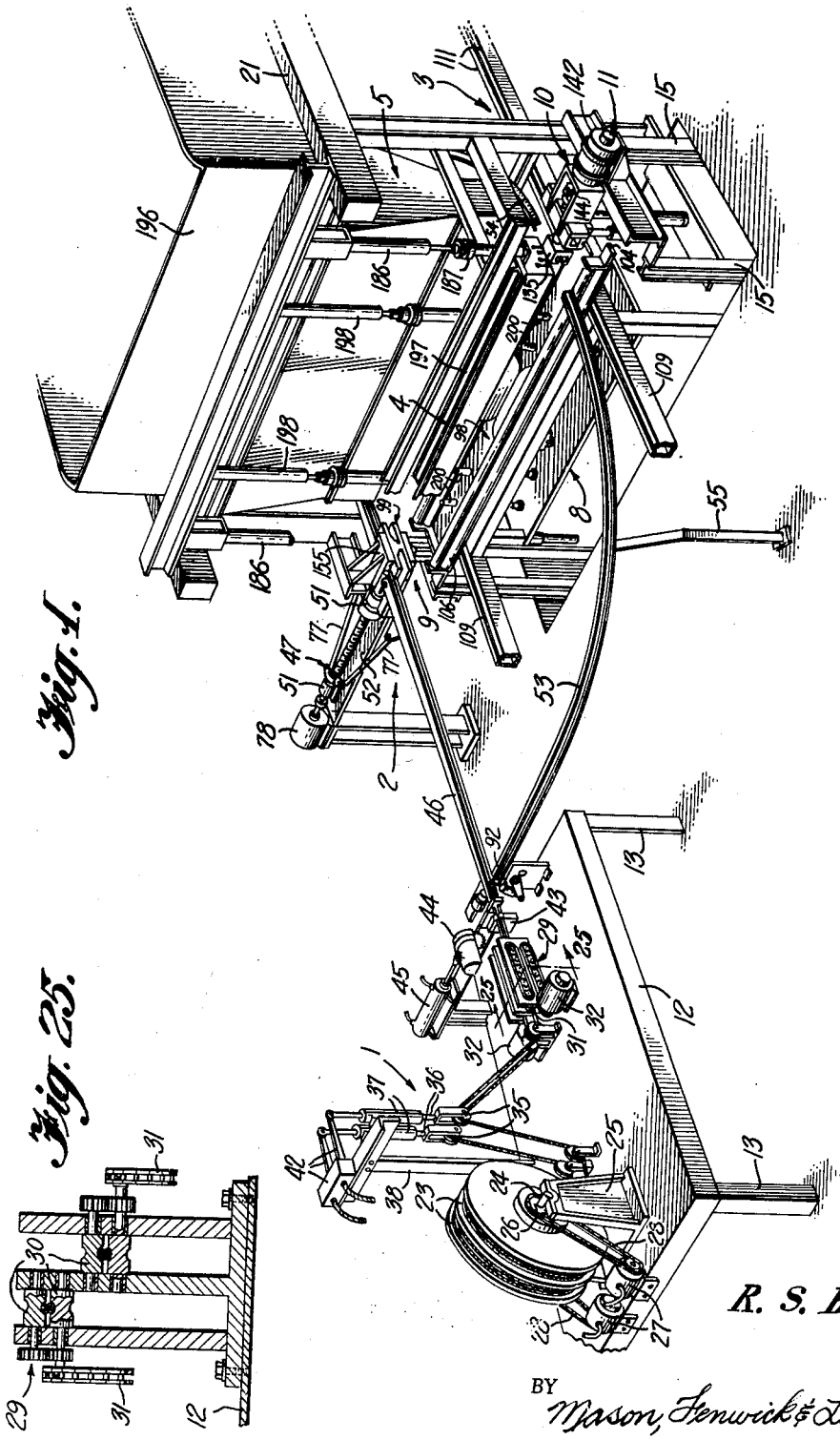

April 14, 1964

R. S. BAKER 3,128,521

APPARATUS FOR MOLDING PRE-STRESSED CONCRETE MEMBERS

Filed Oct. 5, 1959

12 Sheets-Sheet 1

INVENTOR
*R. S. Baker*

BY
*Mason, Fenwick & Lawrence*
ATTORNEYS

INVENTOR
R. S. Baker

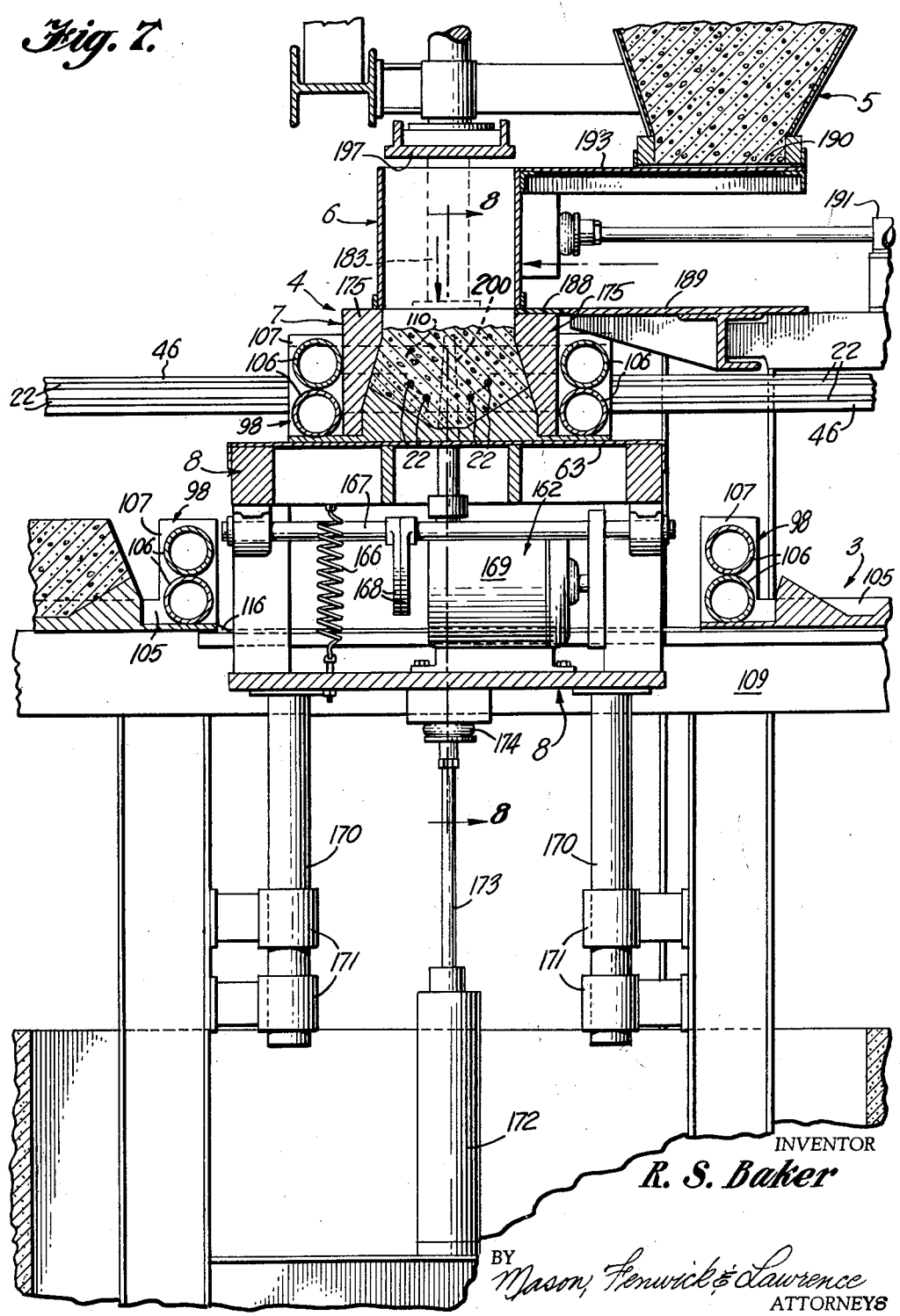

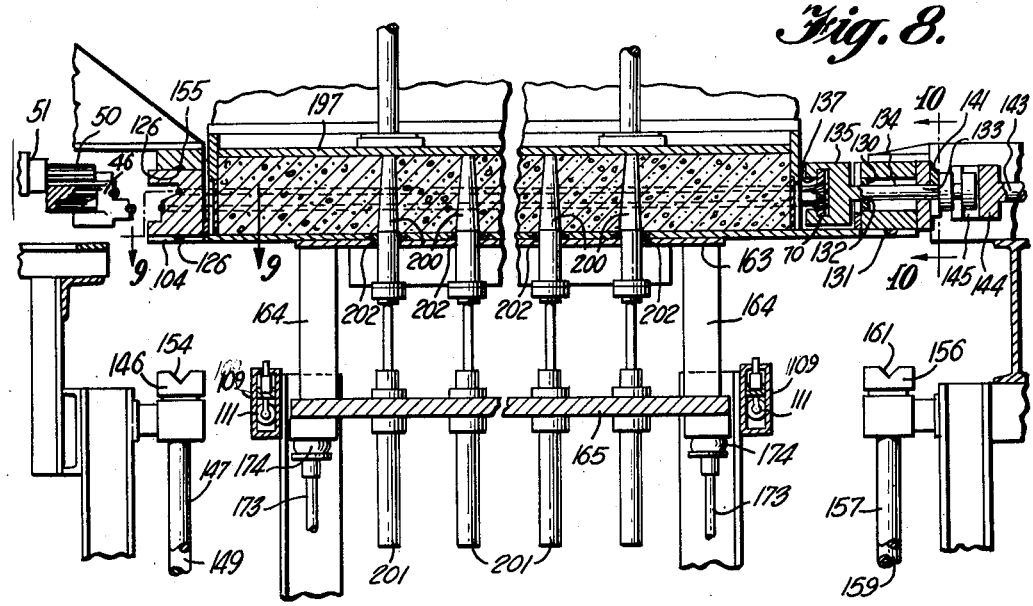

April 14, 1964  R. S. BAKER  3,128,521
APPARATUS FOR MOLDING PRE-STRESSED CONCRETE MEMBERS
Filed Oct. 5, 1959  12 Sheets-Sheet 9

INVENTOR
*R. S. Baker*

BY *Mason, Fenwick & Lawrence*
ATTORNEYS

April 14, 1964  R. S. BAKER  3,128,521
APPARATUS FOR MOLDING PRE-STRESSED CONCRETE MEMBERS
Filed Oct. 5, 1959  12 Sheets-Sheet 10

INVENTOR
R. S. Baker
BY Mason, Fenwick & Lawrence
ATTORNEYS

April 14, 1964 R. S. BAKER 3,128,521
APPARATUS FOR MOLDING PRE-STRESSED CONCRETE MEMBERS
Filed Oct. 5, 1959 12 Sheets-Sheet 11

INVENTOR
*R. S. Baker*

BY *Mason, Fenwick & Lawrence*
ATTORNEYS

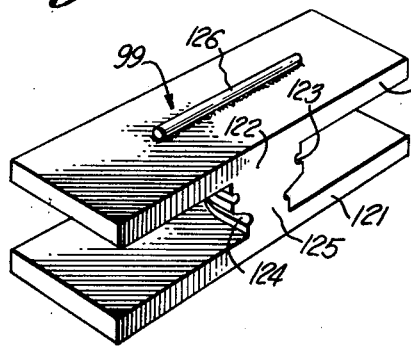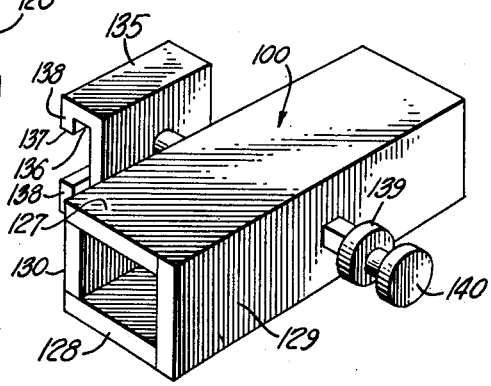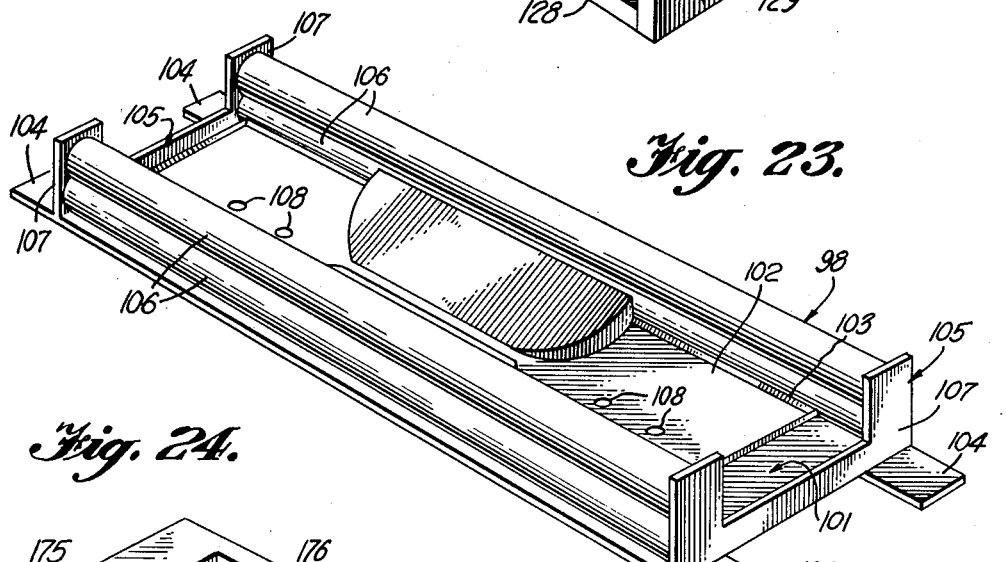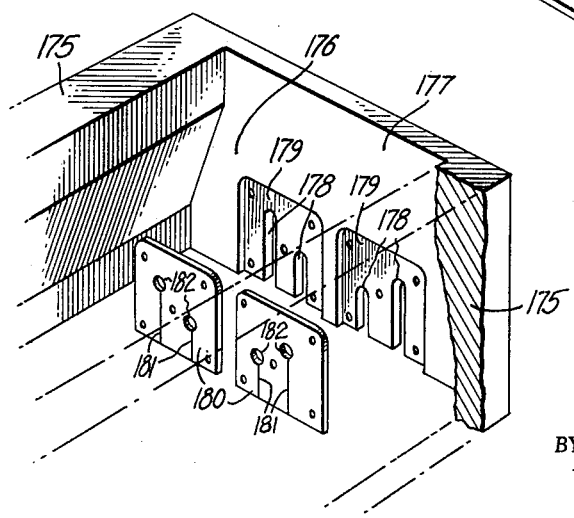

United States Patent Office 3,128,521
Patented Apr. 14, 1964

3,128,521
APPARATUS FOR MOLDING PRE-STRESSED CONCRETE MEMBERS
Robert S. Baker, Greensboro, N.C., assignor, by mesne assignments, of one-third each to J. L. Cone, Jr., C. W. Cone, and Douglas P. Cone, all of Tampa, Fla.
Filed Oct. 5, 1959, Ser. No. 844,441
16 Claims. (Cl. 25—41)

This invention relates to equipment for molding pre-stressed concrete members, and more particularly to machinery for molding pre-stressed concrete members, such as railway ties for example, automatically and as a continuous process.

The use of pre-stressed concrete structural members in various construction lines has grown rapidly, due to the increased recognition of their capabilities, low cost, and long life. Production of such members has been relatively slow, as the very nature of the product has prohibited, until now, the use of mass production methods.

In making a pre-stressed concrete member, tensioning or stressing cables must be laid in the molds and subjected to a preliminary tensioning. The tension applied is in the order of thousands of pounds, and has required heavy and rigid equipment. After the cables are tensioned, the concrete is poured, but the cable tension must be maintained until the concrete is set and cured. Only after full curing can the cables be cut and the tension released from the holding means to stress the molded member. This is time-consuming, and ties up costly equipment which occupies considerable space. With this system, space requirements for real volume production are prohibitive. Even where space and adequate equipment are available, the tie-up time of equipment during product curing is enormous.

The object of the present invention is to provide a machine and associated equipment which will enable automatic and continuous production of prestressed concrete members without necessity for shutdown for curing of the product.

A more specific object of the invention is to provide an automatic machine for molding pre-stressed concrete members which will deliver pallets and appertinent members to a molding station, lay and pre-tension the necessary cables, pour the concrete and deliver the poured member from the machine with the stressing cables held under tension for storing while curing takes place.

Another object of the invention is to provide a machine of this character wherein cables to be stressed may be fed to the machine, have their ends locked to tensioning heads, and placed under required tension entirely by automatic means.

A further object is the provision of accessory equipment for use with the machine which will make it possible to employ but a single cable tensioning device, the accessory equipment thereafter serving to hold the cables tensioned while the concrete is poured and during the ensuing curing period apart from the machine.

Yet another object is the provision of cable end splaying mechanisms capable of automatically spreading the ends of multi-strand cables to receive wedges for locking the cable ends to tension plates.

A still further object of the invention is to provide novel means for feeding the tensioning cables to the machine to provide for uniform cable feed irrespective of the diameter of the reels from which the cables are being fed.

It is also an object to provide in a machine of this nature a mold box which may be moved into place over a pallet having the cables pre-tensioned upon it, with provision for sealing around the cable exits through the box to prevent loss of concrete during pouring.

Other objects of the invention will become apparent from the following description of one practical embodiment thereof when taken in conjunction with the drawings which accompany, and form part of, this specification.

Figure 2:
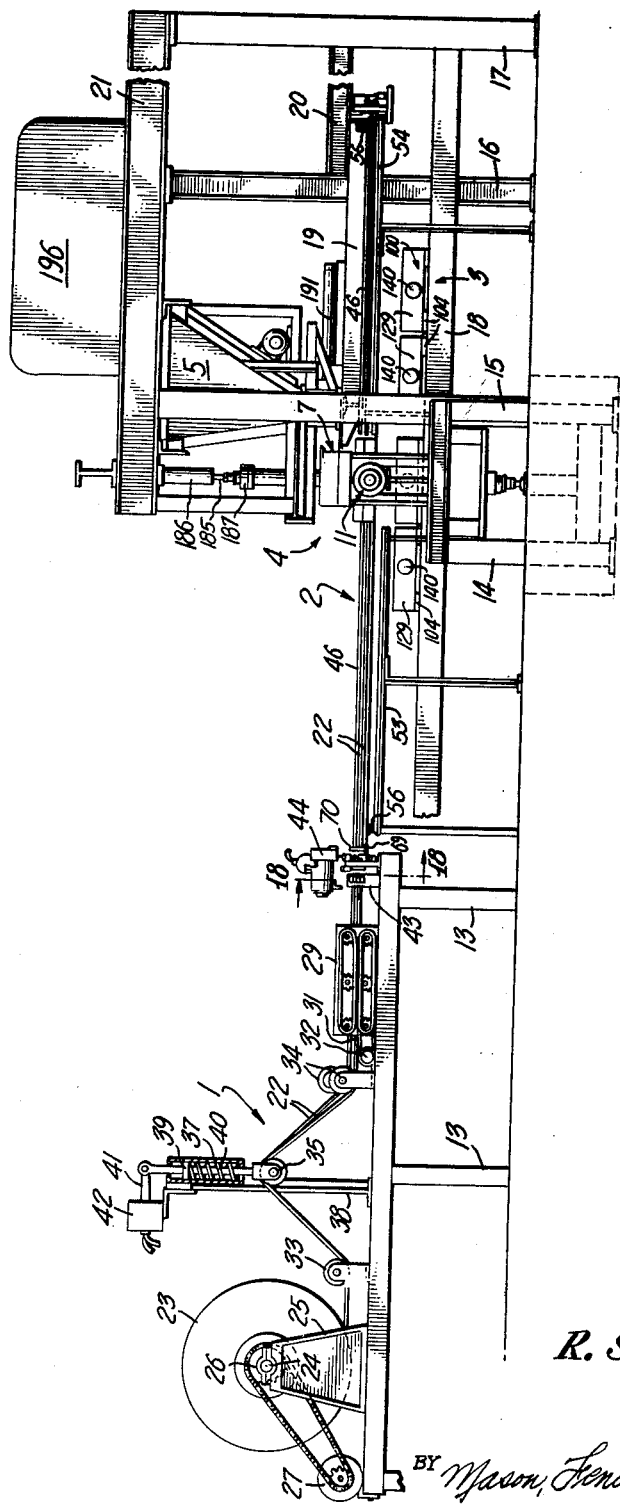
Figure 3:
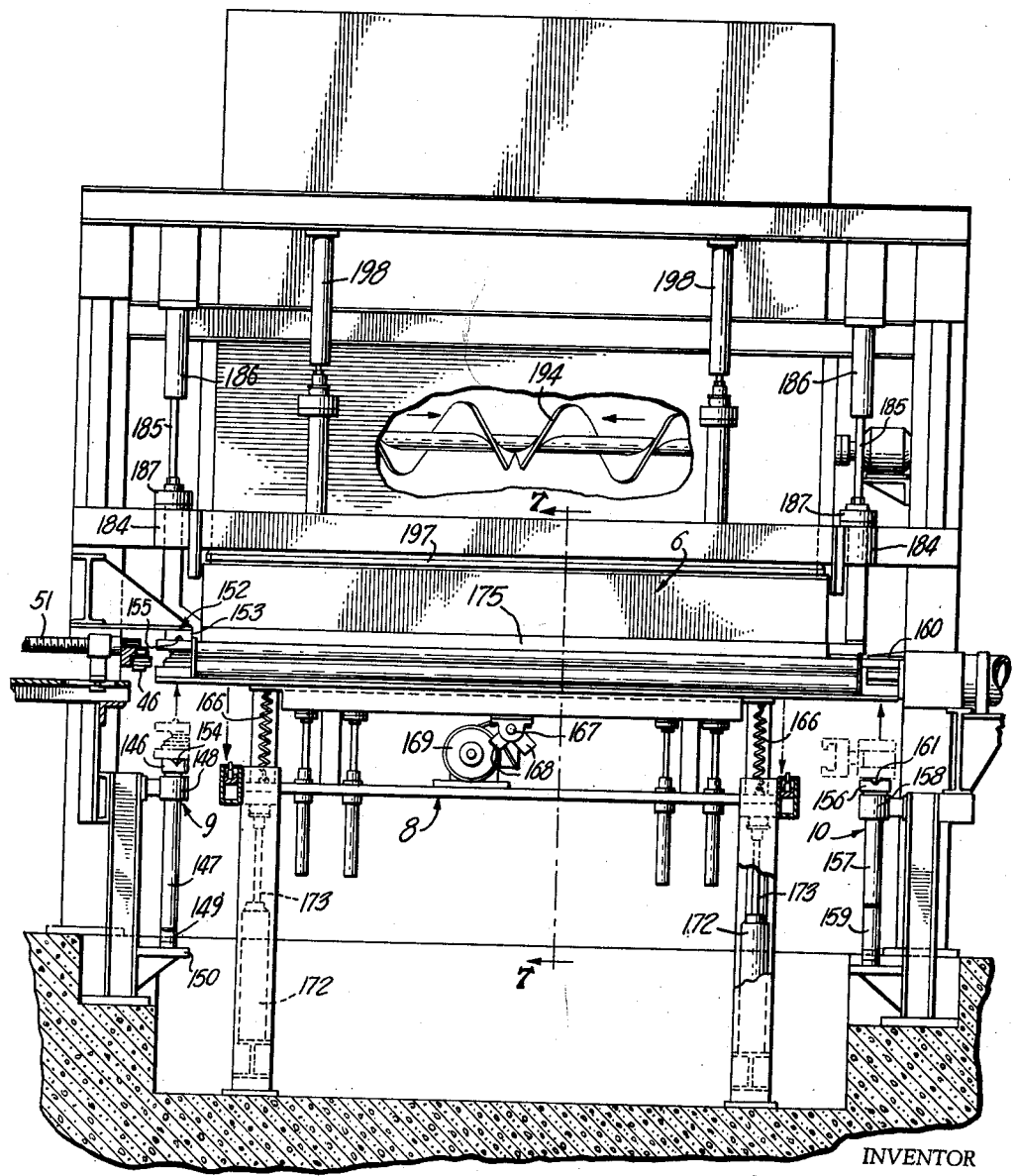
Figure 4:
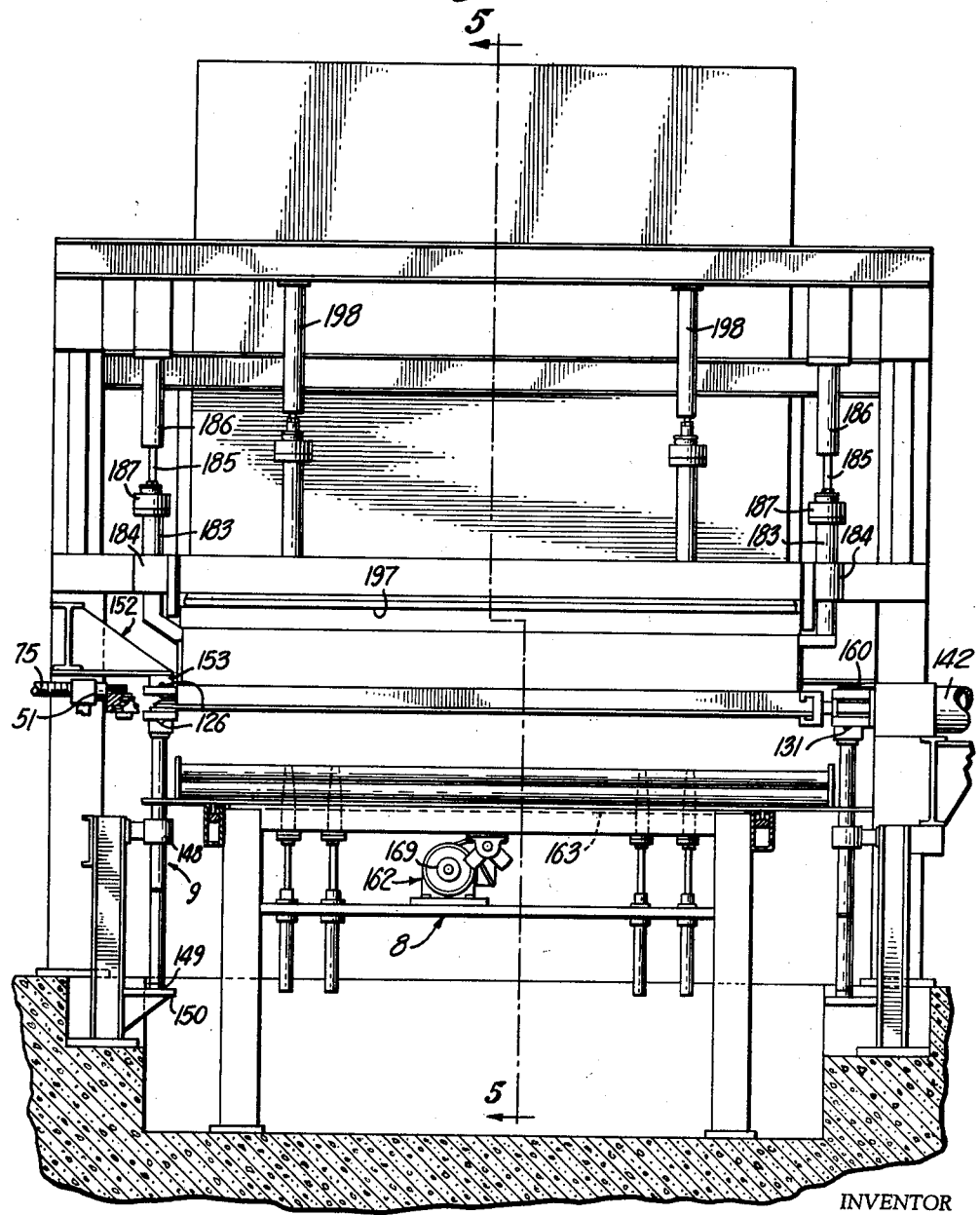
Figure 5:
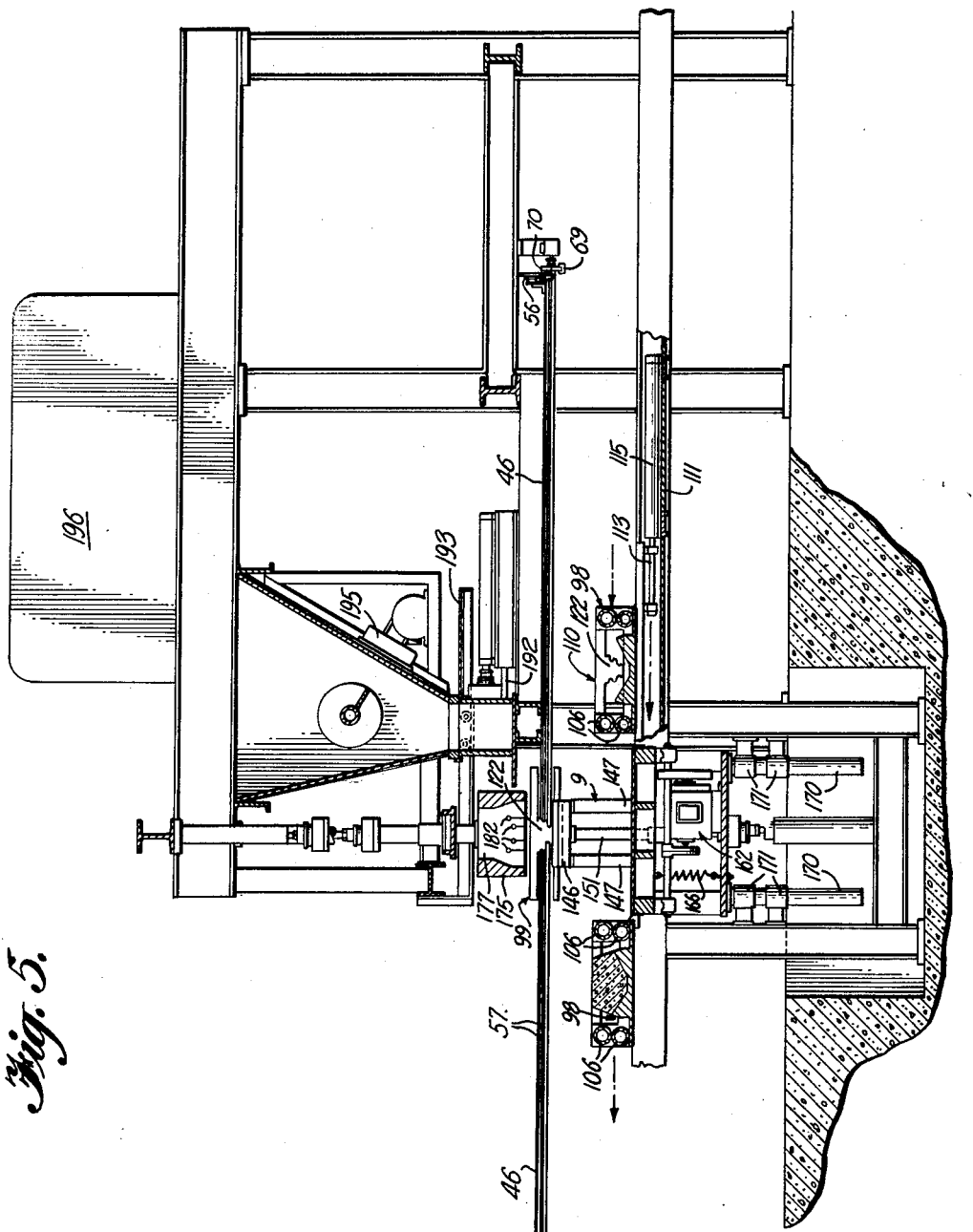
Figure 6:
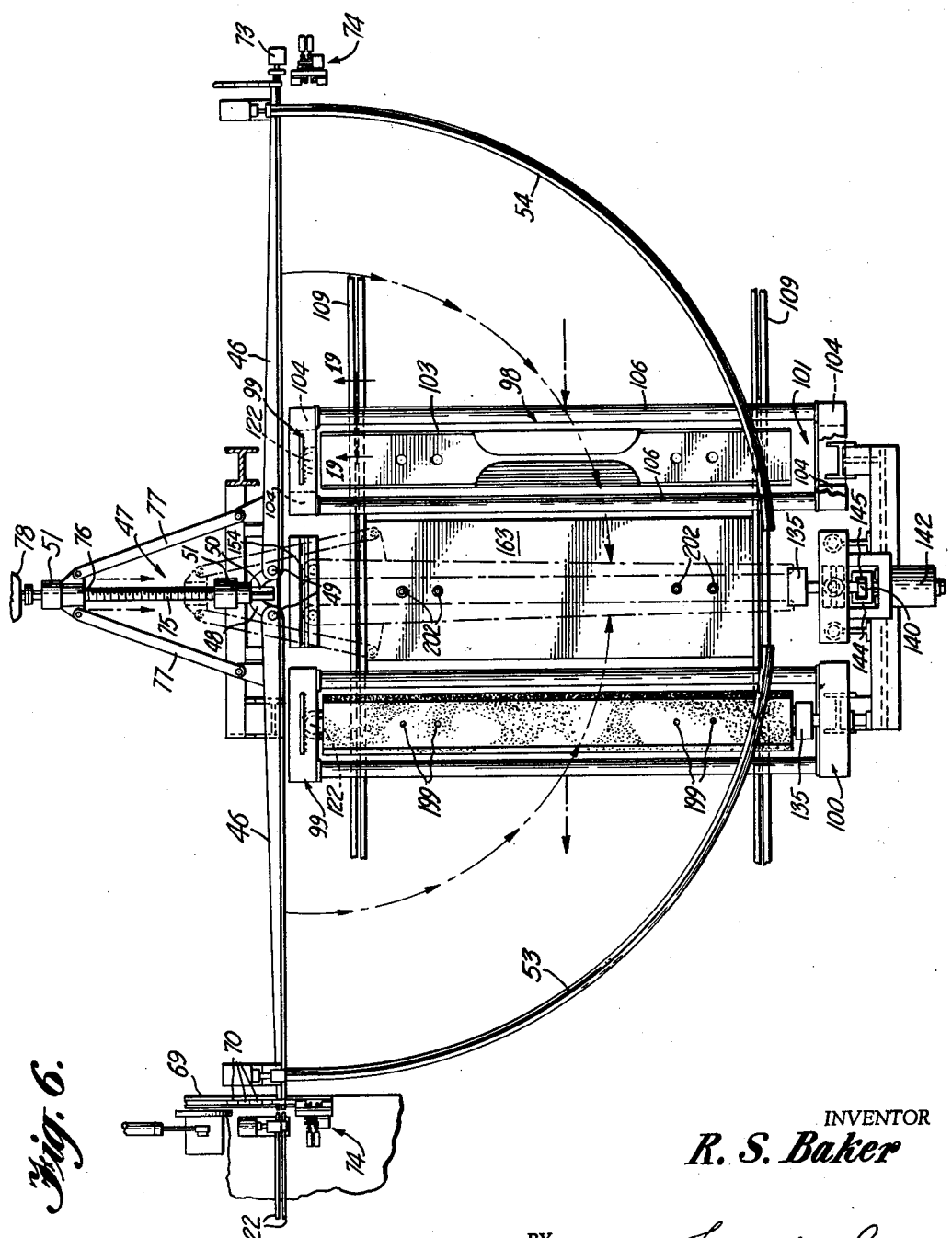
Figure 11:
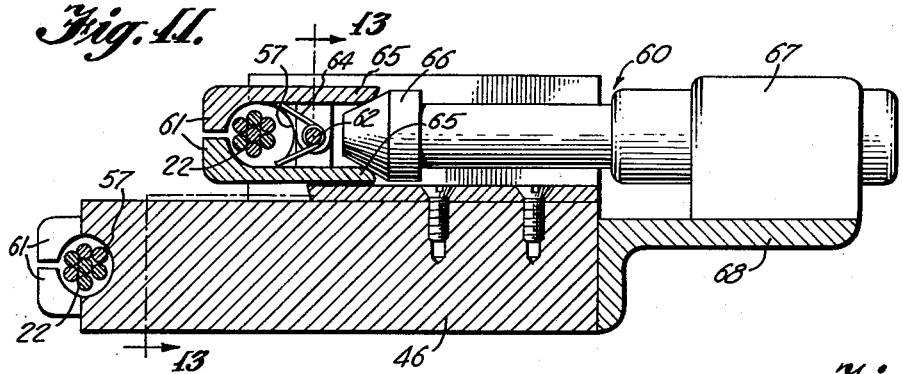
Figure 12:
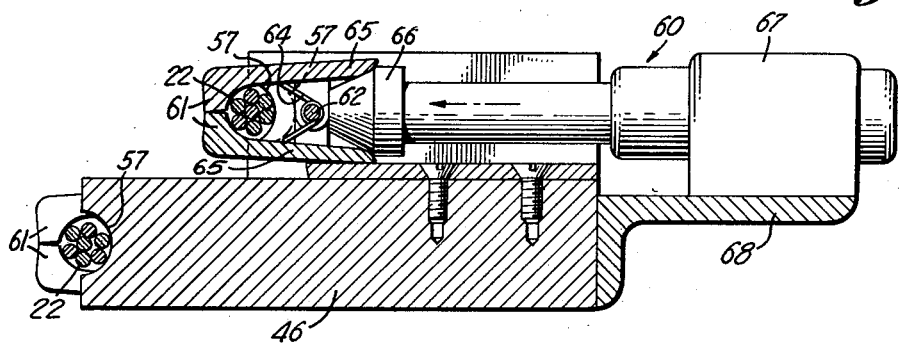
Figure 13:
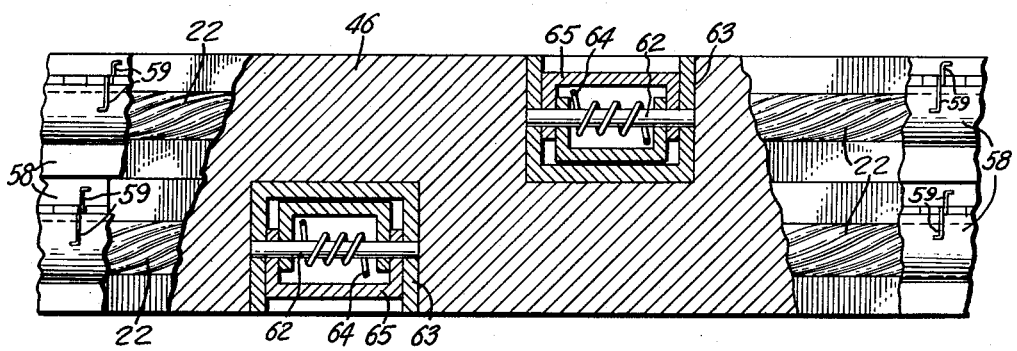
Figure 14:
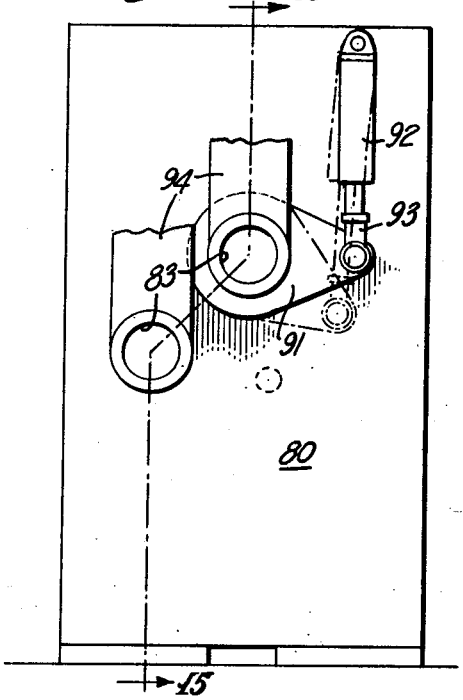
Figure 16:
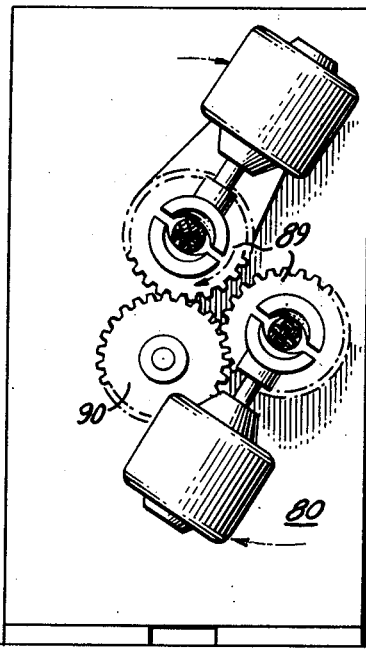
Figure 15:
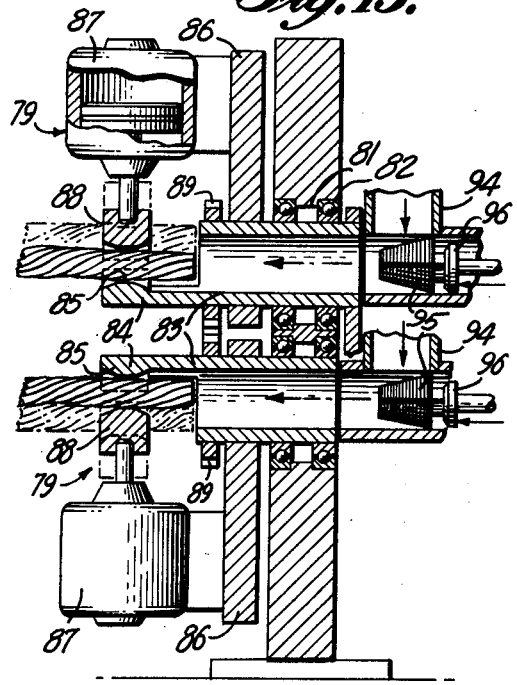
Figure 17:
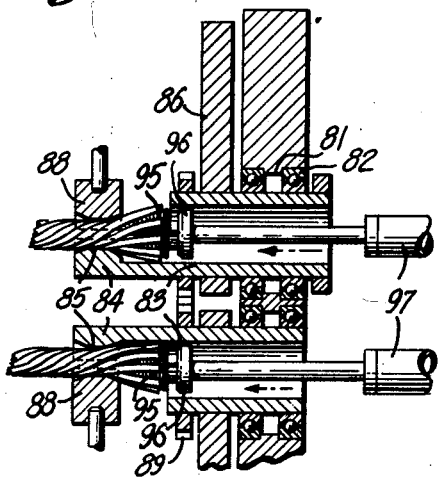
Figure 18:
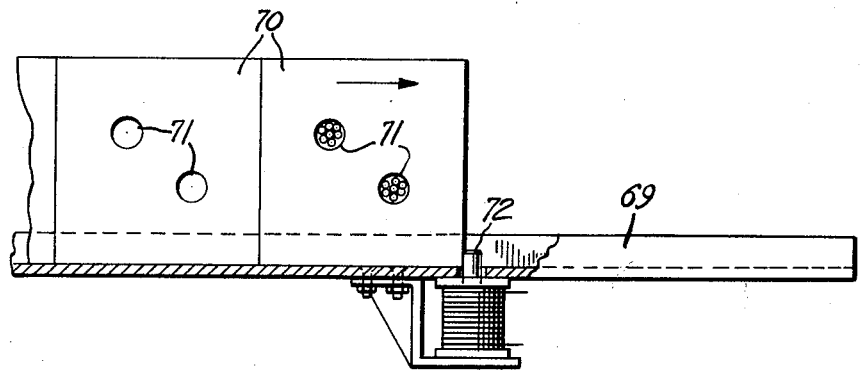
Figure 19:
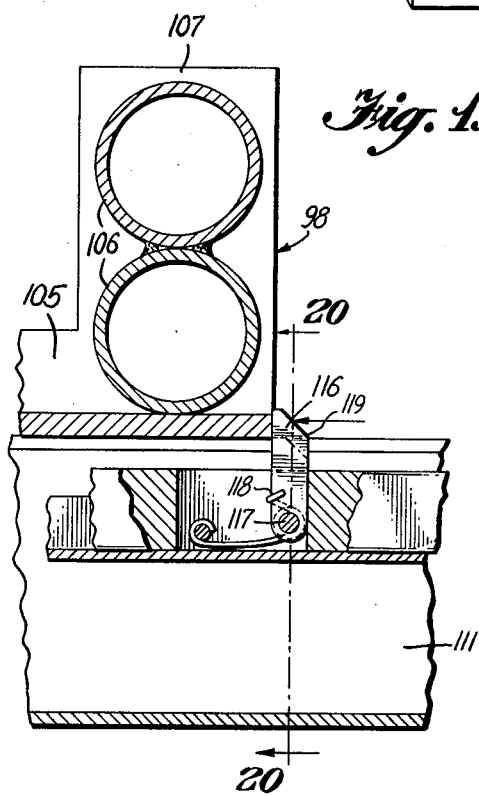
Figure 20:
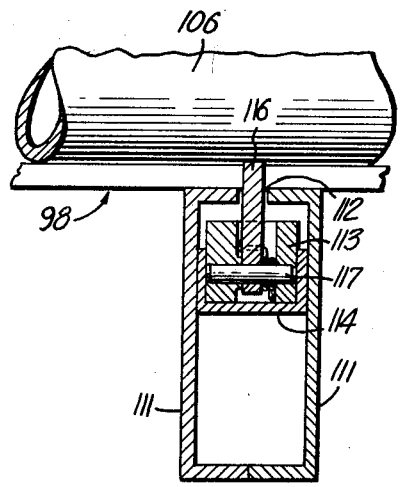

In the drawings:
FIGURE 1 is a perspective view of a machine for molding pre-stressed concrete members constructed in accordance with the principles of the present invention;
FIGURE 2 is a side elevational view of the machine shown in FIGURE 1;
FIGURE 3 is a vertical, transverse section through the machine adjacent the molding station with the parts in pouring position, and is taken substantially on the line 3—3 of FIGURE 2;
FIGURE 4 is a view similar to FIGURE 3 but with the pallet lowered and the mold box raised;
FIGURE 5 is a longitudinal section through a portion of the machine and is taken on the line 5—5 of FIGURE 4;
FIGURE 6 is a horizontal section illustrating the mechanism used for receiving and positioning the cables for tensioning, and is taken substantially on the line 6—6 of FIGURE 5;
FIGURE 7 is an enlarged view, similar to FIGURE 5, of that portion of the machine adjacent the molding station and showing the parts in molding position;
FIGURE 8 is a transverse section taken on the line 8—8 of FIGURE 7;
FIGURE 9 is a horizontal section taken on the line 9—9 of FIGURE 8, illustrating one end of the mold, pallet and cable-holding dead end header;
FIGURE 10 is a section taken on the line 10—10 of FIGURE 8, showing a tension locking key;
FIGURE 11 is a section through one of the cable laying arms and shows the air clamps used to hold the cables in place on the arms;
FIGURE 12 is a view similar to FIGURE 11 with the clamps in holding position;
FIGURE 13 is a section taken on the line 13—13 of FIGURE 11;
FIGURE 14 is an elevation of mechanism employed to splay the ends of cables before inserting a wedge;
FIGURE 15 is a vertical section through the structure shown in FIGURE 14;
FIGURE 16 is an elevational view of the cable splaying unit viewed from the opposite side from FIGURE 14;
FIGURE 17 is a view similar to FIGURE 15 showing the parts in a moved position;
FIGURE 18 is a sectional view through the anchor plate track taken on the line 18—18 of FIGURE 2;
FIGURE 19 is a detail illustrating the pallet advancing mechanism and is a section taken through the pallet track substantially on the line 19—19 of FIGURE 6;
FIGURE 20 is a transverse section through the structure shown in FIGURE 19 and is taken on line 20—20 of FIGURE 19;
FIGURE 21 is a perspective view of one of the dead end headers used with the machine;
FIGURE 22 is a perspective view of a jack header;
FIGURE 23 is a perspective view of the improved pallet;
FIGURE 24 is a fragmentary perspective showing one end of the mold box with the parts separated for clarity; and
FIGURE 25 is a section through one of the cable feed units taken substantially on the line 25—25 of FIGURE 1.

In general, the machine of the present invention includes automatic means to unreel, feed in and cut off precise lengths of cable for tensioning, fix the ends of the cable in anchor plates, arrange the cable lengths in proper position at the molding station, and put them under tension. At the same time, pallets and headers are fed into the machine to the molding station, where the headers are raised and engaged with the tensioning cables. After partial tensioning of the cables, the pallet is raised between the headers and tensioning is completed, with the pallet serving as the bridge between the headers and holding the cables under tension. A mold box is then moved onto the pallet and the concrete poured. After pouring, the pallet, holding the cables tensioned and supporting the cast member, is lowered and transported from the machine to be cured.

While the machine and special equipment of the present invention may be used to mold prestressed concrete members of various kinds, the invention is illustrated and described in connection with the molding of railway ties.

Referring to the drawings in detail, and first adverting to FIGURES 1, 2, 3, 5 and 7, the machine includes a cable feeding station 1, cable-receiving and positioning means 2, a pallet feed line 3, and a molding station 4. At the molding station, there is a concrete mixer and hopper 5, a charge box 6, a mold box 7, pallet and header elevators 8, 9 and 10, and a cable tensioning jack 11.

The various elements of the machine are mounted upon a suitable framework. The feeding station may be mounted on a platform 12 having legs 13. The remaining mechanism may be conveniently fixed, or supported upon, an open frame having suitably positioned vertical posts 14, 15, 16 and 17, bridged by horizontal rails 18, 19, 20 and 21. It will be understood that the frame forms no part of the present invention, and is shown only to illustrate some supporting means for the various operating mechanisms.

The cable to be used for stressing the cast members is a multi-strand type, having a plurality of outer strands twisted about a straight central strand. The cable 22 is wound upon reels 23 from which it is drawn in required lengths for use in forming the railway ties. As the cables are to be used in pairs in the procedure illustrated, two reels 23 will be mounted upon an axle 24 and set up at the feeding station by journalling the axle in support standards 25. Each reel will carry a sprocket 26, and each will be rotated by its motor 27 through chain 28. Thus, each reel will be independently rotated so that the speed of each can be controlled to pay out cable at a constant rate, irrespective of the diameters of the windings on the respective reels. A constant pay-out rate from the reels is obtained through the use of feeding units 29. Each unit will include one or more roller couples 30 mounted in a suitable frame with at least one roller couple being driven through chains 31 from motors 32. If two cables are used, two feed units will be employed. The motors 32 will be run at the same speed so that identical feed rates will be had from the two units. If more than one roller couple is used in each unit, the additional ones will serve to guide the cable and give it the proper feed direction. It will be obvious that the two feed units must be so positioned relative to each other and to other parts of the machine to be described that the proper cable pattern, or arrangement, will be provided for. In other words, the roller couples of the respective units must be spaced laterally and vertically from one another to accurately determine the axis of feed for the two cables.

To gain different motor operation to ensure proper constant feed rates from the feed units, the cables pass under pulleys 33 adjacent the reels and pulleys 34 adjacent the feed units. Intermediate the pulleys 33 and 34, the cables pass over pulleys 35 which are mounted for vertical movement. Each pulley 35 is carried at the bottom of a rod 36 which is slidably mounted in a tube 37. The tube is held stationary by being fixed to a post 38 carried by the platform 12. Rod 36 carries a collar, or other enlargement 39, which bears against one end of a spring 40 which encircles the rod and bears against one end of the tube 37. In the arrangement shown, the spring biases the rod upwardly to lift pulley 35 and keep all slack out of the cable passing over the pulley. The upper end of rod 36 is connected to an operating lever 41 of a motor control 42. Vertical movement of a rod 36 will result in operation of the control 42 to increase or decrease the speed of the reel motor 27 as required by the constant rate feed of the unit 29. It will be obvious that when a feed unit 29 is feeding cable at a rate faster than it is being payed out from the reel, the bight of the cable between pulleys 33 and 34 will be reduced in length, drawing down on rod 36 to actuate the motor control 42 to increase its speed. If the pay out rate is too fast, the cable bight will increase in length and spring 40 will lift rod 36 to operate control 42 in an opposite direction to reduce the reel motor speed.

The free ends of the cables will be held in air clamps 43, mounted on the platform, when the feeding station is inoperative. The clamps not only hold the cables against forward movement but also hold the cables against lateral movement while being cut by a rotary saw 44 carried by the piston of a fluid cylinder 45 fixed to the platform 12. Operation of the cylinder assembly will cause the saw 44 to move across the cable feed path and sever the cables closely adjacent the air clamps 43. The cut ends will remain held in the clamps and accurately positioned for the next feeding movement. It will be understood that the motors 27 and 32 will operate only when cable is being fed.

When the mechanism at the feeding station is operated, the cables are fed into the cable-receiving and positioning means 2. This means includes essentially a pair of pivoted cable-laying arms 46 and means 47 for moving these arms to cause cable lengths placed on the arms to assume proper positions for tensioning at the molding station.

The cable-laying arms 46 are enlongated members mounted to assume longitudinal alignment, so that when in alignment one forms a continuation of the other. They are pivoted at their adjacent ends to a yoke 48 by means of pivot pins 49. Yoke 48 is slidable upon a shaft 50, horizontally mounted in a support for a bearing 51 carried by a horizontal beam 52 of the machine frame. Shaft 50 lies transversely of the machine and to one side, which positions arms 46 along one side of the machine. Due to the fact that the arms will be of considerable length, and also that the outer ends of the arms must be maintained in a fixed horizontal plane at all times, tracks 53 and 54 are provided to support and guide the arm free ends. Tracks 53 and 54 extend horizontally and are substantially arcuate. They extend from the positions of the free ends of the arms when in alignment at one side of the machine to the opposite side of the machine. Track 53 may be supported from the floor on posts 55, but track 54 will be suspended from the rail 20 of the frame. Each arm will carry a rearwardly projecting caster 56 to ride upon its respective track.

The arms will be provided with cable-receiving channels 57 into which the cables will be fed and then held until the arms have positioned the cables in their proper position for tension. The channels will be in the form of grooves recessed in the forward face of the arms. By forward face is meant that side of the arm which is toward the machine when the arms are in alignment with one another, and the side which will be toward the other arm when the arms are swung about the pivots and brought into parallel adjacency transversely of the machine, as will be described. The forward faces of the arms will be stepped, or otherwise contoured, as needed to permit the channels 57 to occupy the cross-sectional position in the arm relative to one another required by the cable pattern of the product to be molded. In the present instance, the channels are shown offset laterally and vertically from one another to the same extent and degree as the positions of the feed units 29 at the feeding station. Arms 46 are so mounted that channels 57 will be in direct alignment with the cable feed so that when the cables are fed the ends will enter the channels and move along the full combined length of the arms.

The cables are yieldingly held in position in the arm channels 57 by cover clips 58 hinged to the arms above the channels and urged by springs 59 into channel covering position. It will be obvious that when desired the cables can be moved forwardly out of the channels, and such movement will lift the caps against the action of the springs. The cables are actually gripped, and positively held against movement in any direction by means of air clamps 60 located near the free ends of the arms. There will be one clamp for each groove on each arm. These air clamps are conventional, and may include a pair of jaws 61 pivotally mounted upon a pin 62 which spans a channel mounting member 63. The jaws will be biased to open position by springs 64 coiled about the pin 62 and bearing against the jaws. The jaws will have extensions 65 projecting rearwardly beyond the pivot pin for engagement by a conical plunger 66 operated by an air cylinder 67 mounted on a bracket 68 at the back of the arm. It will be clear that movement of the plunger between the jaw extensions 65 will rock the jaws into clamping engagement of a cable between them.

Before proceeding to a description of the arm movement and the means for accomplishing it, it will be well to point out that at the end of each arm position (when the arms are longitudinally aligned in cable-receiving position) there is a track 69 to support and convey cable anchoring plates 70. These are rectangular plates which are provided with openings 71 arranged to receive the cables in the desired pattern. The holes are tapered to provide conical seats for the cable ends spread by cone wedges, as will be described. Tracks 69 are simply channel members along which the plates will slide on end. A suitable stop, such as the solenoid-operated pin 72 may be used to arrest the movement of the plates along the track and position the lead plate with its holes 71 in axial alignment with the channels 57 of the arms and the guided ends of the cables at the feed station. It will be noted that one of the tracks lies at the feeding station so that the plates upon it will be between the feed units and the arm, and the other track lies at the far end of the other arm. With the elements in this position of alignment and the several air clamps 43 and 60 in released position, the motors 27 and 32 are started to feed the cables. The ends of the cables will thread through the openings in the anchor plate 70 on the track 69 adjacent the feed units, into the channels and through the air clamps on the arms and finally through the openings in an anchor plate on the track 69 at the far end of the machine. Positioned in back of this last-mentioned plate is a limit switch 73 which will be contacted by the advancing cable ends. Closure of the switch will result in stopping the motors 27 and 32, closing the air clamps 43 and 60 and operation of the fluid cylinder 45 to advance the saw to sever the cables between the anchor plate 70 and the air clamp 43. The length of cable projecting beyond the anchor plates will be the same on both ends.

Thus it will be seen, that while the arms 46 lie in longitudinal alignment, cable lengths of precise dimensions will be laid in the channels and, at the same time the cable ends are threaded through anchor plates positioned at opposite ends of the arms. The anchor plates are against the ends of the arms and the cable is extremely stiff so that the arms and adjacent plates will be tied together by the cables to move as a unit.

After the cables are laid on the arms and cut to length, the arms and end plates are moved to stations 74 where the cable ends will be splayed and wedge anchors slipped between the strands to lock the anchor plates to the cable ends. To accomplish this, the entire arm assembly is moved forward.

It was mentioned above that the yoke 48 to which the arms are pivoted is slidably mounted upon a shaft 50. Shaft 50 is fixed and is aligned with a rotatable shaft 75 journaled in the bearings 51 and carries a nut 76. Links 77 are pivotally connected to the nut 76 and to the arms 46 so that movement of the nut along the screw toward and from the yoke 48 will cause the arms 46 to swing about their pivotal connections with the yoke. Due to the fact that the yoke is slidable on the shaft and the stiffness of the cables will act as a brace tending to hold the arms outspread, movement of the nut along the shaft will cause the yoke to slide with resulting bodily movement of the arms, until such time as the yoke movement is arrested. Such sliding movement of the yoke does occur at the outset of rotation of shaft 50 and the arm and yoke assembly may move inwardly of the machine to move the plates 70 from the cable-threading position to the cable-splaying stations. Shaft 50 is caused to rotate by motor 78 which is coupled to it. Energization of motor 78 may also energize solenoids 72 to withdraw the stop pins from the path of movement of the threaded anchor plates. As soon as the plates reach the splaying stations, motor 78 is stopped.

It has been found, that if the very stiff multi-strand cable is held at two spaced points adjacent its end and one holding member twisted relative to the other so as to tend to wind tighter the twisted strands about the straight center one, the twisted strands at the end of the cable will ride up the straight strand and spread open. This will permit an anchor wedge to be slipped over the central strand and between the spread outer strands. When the cable is released, the strands will tightly grip the wedge and hold it in place. It is contemplated that wedges similar to those disclosed in the copending application of John P. Roebuck, Jr., Serial No. 8,898, filed February 11, 1960, now abandoned, will be used as anchoring members. These wedges have a central opening of predetermined depth to receive the central strand of the cable to limit and precisely fix the position of the wedge relative to the strand. This is important to exactly fix the the cable length between anchoring points and thereby accurately determine the tension which will be imposed by a stretch of known distance.

It was pointed out above that clamps 60 on the arms will grip the cables near the arm ends. The splaying mechanisms 74 consist primarily of a pair of air clamps 79 to grip the cables outboard of the clamps 60, with clamps 79 being mounted for rotation about their respective axes. The clamps 60 will fixedly hold the cables and clamps 79 will cause them to twist.

The splaying mechanism is shown in detail in FIGURES 14 to 17 of the drawings. The mechanism employs a suitable mounting member 80 which may be fixed to the machine frame. The member 80 has spaced openings 81 in which bearings 82 are mounted. Sleeves 83 are carried by the inner races of the bearings and extend through the mounting member 80. Each sleeve terminates at one end in an arm 84 which carries a clamping jaw 85. The jaw is at one side of the axis of the sleeve which is also the axis of rotation of the clamp 79. Mounting plates 86 are fixed to the sleeves 83 for rotation with them. These plates carry air cylinders 87 with movable clamping jaws 88. The air cylinders are mounted so that jaws 88 will be movable toward and from the fixed clamping jaws 85. Each sleeve carries a gear 89, and these gears are in mesh with an idler gear 90 mounted on the mounting member 80 so that movement of one sleeve and its clamp will result in equal and similar rotative movement of the other clamp in the same direction. An actuating arm 91 is connected to one of the sleeves for rotating it. An air cylinder 92 is fixed to the mounting member 80 and connected by link 93 to the actuating arm. Thus, operation of the air cylinder will cause rotative movement of the two clamps 79 and twisting of cables gripped by them.

In order to permit automatic gripping of the cable ends projecting beyond anchor plates 70 brought to the splaying station, it is necessary that the spacing between the fixed jaws 85 of the clamps 79 be less than the spacing between the cable ends. This will permit the cable ends to move freely into place overlying the jaws 85. When clamps 79 are actuated, jaws 88 will engage the cables and press them into the cup of the fixed jaw for clamping. When the operation is completed and the jaws 88 released, the resiliency of the cables will cause the ends to spring up from the fixed jaws 85 so that they will be free to move out of the device when the arms 46 again move.

It will be seen from FIGURES 15 and 17 that feed troughs 94 for wedge cones 95 are arranged adjacent the open ends of the sleeves 83. Wedges may slide, or be fed in any desired manner along the troughs to positions aligned with the sleeves. Inserters 96, carried by air cylinders 97 will operate in timed relation with the twisting movement of the splaying mechanisms to push wedges 95 through the sleeves into the opened ends of the cables. When the inserters are retracted, other wedges will move along the troughs into inserting position.

During the time that the cables are being laid in the arms 46, and the cable ends are being locked in the anchor plates, pallets 98, dead end headers 99, and jacking headers 100 are being moved along the pallet feed path 3 to positions at the molding station. An understanding of these accessories of the machine are necessary to an understanding of the remainder of the machine.

The pallet to be used with the machine will serve, not only to support the cast member, but in cooperation with the headers 99 and 100, also as a means to hold the cables under tension during the concrete curing period, thus making it possible to remove cast articles from the machine immediately after molding for curing at some other location.

Pallet 98 is an elongated member which is essentially channel shaped in cross-section to provide the requisite rigidity to withstand the cable tension which will be imposed upon it. In the form shown, its bottom 101 is made as a rectangular casting. The central portion of the upper surface is raised in a generally rectangular area 102 and contoured to provide the desired bottom shape for the member to be molded, in the present instance a railway tie. The raised central area 102 is of proper size and located so as to fit snugly within the bottom of the machine mold box 7, as will be described, and the peripheral area 103 of the pallet base will seat flat against the mold box bottom edges. The base portion of the pallet has a small ledge, or foot, 104 projecting outwardly longitudinally of the base from each corner. These feet will provide spaced platforms for the headers 99 and 100, as will be seen. At each end of the base, a U-shaped end plate 105 is welded in an upright position across the end of the base to form end abutments for tubular spreaders 106, which have their ends fixed to the vertical legs 107 of the end plates, and extend the full length of the pallet. Two tubular spreaders 106 are arranged one above the other along each side of the pallet. The pallet base is sufficiently wide so that the mold box 7 will fit between the spreaders and the raised area 102 of the base. Thus it will be seen, that the pallet has the form of a channel type girder, with the cast base 101 forming the channel bottom and the superposed tubular spreaders forming the side walls. The major load imposed against the end plates 105 will be taken directly by the spreaders as an end thrust. The base of the pallet has a plurality of openings 108 which will serve as locating openings in positioning the pallet at the mold box.

Pallets, such as just described, will be fed into the machine and advanced along the feed path 3. They will move upon transversely spaced rails 109, fixed to the vertical posts of the frame, to a delivery position occupied by the pallet indicated as 110 in FIGURE 5. The pallets may be moved to this position by any suitable conveyor (not shown) or they may be placed upon the rails 109 and moved into the delivery position manually. It will be noted that the length of the pallet is considerably in excess of the span of the tracks 109, so that the pallet ends overhang the tracks. This permits the use of pallet advancing means working in the tracks to advance the pallet to the mold station and, after molding, from that station. To this end, the rails 109 are each formed of a pair of channel members 111 arranged face to face and slightly separated to leave a slot 112 between them. A push-rod 113 is mounted in guides 114 within each rail 109 for reciprocating movement longitudinally of the rails. Each push rod will be actuated by a fluid cylinder 115 fixed to the rails. The push rods carry a plurality of pallet-engaging fingers 116 to seat against the rear edges of pallets on the rails and, as the push rods are advanced, push the pallets forward along the tracks. The spacing between the fingers 116 of the push rods is equal to the stroke of the rods and the stroke is sufficient to move a pallet from the delivery position 110 to the mold station. The fingers are arranged to advance the pallets so that the pallets will be simultaneously moved from the pallet delivery position to the mold station, from the mold station to an ejecting position, and from the ejecting position to a suitable conveyor, or ejection platform (not shown). Fingers 116 are pivotally connected to the push rods, as at 117, and biased to upright position by springs 118. The rear edges of the fingers are inclined, as at 119, to cam against the forward edges of pallets as the push rods are retracted to tilt the fingers to pass under the pallets. As soon as the fingers pass beyond the pallet rear edges, they will spring back to operative, upright position, ready upon the next forward movement of the push rods to advance the pallets to the next adjacent positions.

Previous mention was made of the fact that the projecting feet 104 of the pallet will form ledges to support the headers 99 and 100. In practice, a header of one type will be placed upon the feet of the pallet at one end, and a header of the other type upon the fet at the opposite end prior to, or at the time of, delivery of the pallets to the machine, so that each pallet will be advanced to the mold station carrying two headers. The dead end header 99 will be at the end of the pallet adjacent the wire receiving arms 46, and the jacking header 100 will be at the opposite end of the pallet, which is at the jacking side of the machine. The headers, being on the feet 104, will be on the overhanging ends of the pallet, outside the pallet rails 109.

The dead end headers 99 are bridging members, adapted to span the U-shaped end plates of the pallets and form a holding means for the cables to be tensioned. This header is to have the cables wrapped around it and its pulling force will be exerted against the central bight of the doubled over cables. The header is approximately as long as the width of the pallet so that its ends may have maximum bearing against the legs of the U-shaped end plate of the pallet. It has upper and lower plates, or flanges, 120 and 121, held in spaced relation by means of a center post 122. The center post is flush with those edges of the top and bottom flanges which will bear against the pallet end plate. The center post is grooved, as at 123 and 124, with the grooves vertically spaced apart in accordance with the vertical spacing in the cable pattern over the arms 46 and in the final cast member. The inner surface of the post 122 is convexly curved, and the grooves follow the arcuate curvature so that no sharp cable bends will occur. The grooves are struck from different radii so that the cables will have the proper lateral spacing required by the cable pattern. Due to the fact that the cable lengths laid on the arms 46 are identical, the grooves in post 122 are not concentric, but the groove having the smaller radius is displaced inwardly of the bearing face 125 of the header a greater distance than the groove of larger diameter. Thus, the cable having the sharper bend will have its bight held further from the header bearing face by a distance sufficient to compensate for the difference in cable lengths required to make the respective bends. The headers have positioning ribs 126 along at least a portion of the exposed surfaces of the top and bottom flanges for cooperation with other members, as will be described.

The jacking header 100 is of somewhat different construction. The header proper, that is that portion which spans the U-shaped end plate of the pallet, is of box-like construction having upper and lower plates 127 and 128, a back plate 129 and a separator 130 between the bearing edges of the plates 127 and 128. These parts are welded together, or otherwise joined, to form a tubular member. A positioning rib 131 projects from the bottom of the lower plate 128.

The tubular header just described is provided with openings 132 and 133 in the separator and back plates to slidably receive a square jacking shaft 134. Shaft 134 carries at its front end, that is the end toward the pallet, an anchor plate-receiving coupler 135. This coupler has a plate channel 136 extending completely through it horizontally, into which the anchor plates 70 may slide from opposite sides of the coupler. A slot 137 along the front face of the coupler opens to the channel and accommodates the cables which are attached to the anchor plates. The slot is of less width than the channel, leaving overhanging lips 138 at the top and bottom of the channel to engage the edges of the anchor plates and hold them in the coupler. The opposite end of the shaft carries spaced enlargements 139 and 140. Enlargement 140 at the end of the shaft forms a foot to be engaged by the jack 11, as will be described. Enlargement 139, spaced inwardly from the enlargement 140 provides a locking shoulder upon which a U-shaped locking clip may bear when slipped over the shaft to hold the shaft against longitudinally sliding movement relative to the header.

Jack 11 may be any suitable heavy duty fluid operated jack. The jack cylinder 142 will be mounted upon the machine side frame at an elevation above the pallet path and in the horizontal plane of the cable arms 46. The jack piston rod 143 will carry a clevis 144 at its end having a T-slot 145 extending vertically through it. This will permit the foot 140 on jacking shaft 134 to slide upwardly into engagement with the jack clevis when the header 100 is raised to cable-receiving position.

As previously mentioned, pallets will move into the machine along the feed path and headers 99 and 100 will be carried on the pallet feet. When a pallet is advanced to the molding station, the pallet will overlie its elevator 8, and the headers will be positioned directly above their respective elevators 9 and 10. Upon arrival of the pallet assembly at this position the header elevators will operate to lift the headers from their positions upon the feet of the pallet and raise them to the plane of the cable arms where they will receive the cables.

The elevator 9 for the dead end header comprises a platform 146 mounted upon guide posts 147, slidable in bearings 148 carried by the machine frame. A fluid cylinder 149 is mounted upon shelf 150 on the frame and has its piston rod 151 fixed to the elevator platform.

Above the elevator there is a header stop 152 mounted on the frame. The stop includes a stop plate 153 against which the header will abut when lifted on the elevator to accurately position it relative to the horizontal plane of the cable arms. Elevator platform 146 has a longitudinal groove 154 and stop plate 153 has an aligned groove 155 into which the positioning ribs 126 of the dead end header may seat. When the elevator first moves up into contact with the header seated on the pallet feet the seating of the bottom rib 126 in the platform groove 154 will correctly align the header. When the header is clamped between the elevator platform and the stop plate, the header will be rigidly held against transverse shifting and will be capable of withstanding initial light tensioning of the cables.

The jack header elevator 10 is substantially the same as the one just described. It has a platform 156 mounted upon guide rods 157 slidable in bearings 158, and is raised and lowered by fluid cylinder 159. A header stop is used at this side of the machine also, but here it consists of a pair of spaced arms 160. As no tensioning strain is to be borne by the jack header in the initial tensioning process, it is not necessary to hold it rigid and a groove 161 in the elevator platform to engage the ribs 131 on the bottom plate of the header to align the header will suffice.

It will be seen that as the elevators 9 and 10 operate, the headers will be lifted to abut their respective limit stops and be clamped in position at the proper level to receive the cables. In rising into position, the foot 140 on the packing shaft 134 of the header 100 will slide into the T-slot 145 in the jack clevis to couple the jacking shaft to the jack.

With the parts in this position, motor 78 will be started again to rotate shaft 75. This will cause the cable arm structure to move forward. As soon as the cable span across the yoke 48 strikes the center post 122 of the dead end header 99, forward motion of the assembly will be arrested. Subsequent movement of the nut 76 along shaft 75 will result in swinging arms 46 about their pivotal connections to yoke 48. Cables 22 will seat in the grooves 123 and 124 in the header center post and be bent around the post as the arms continue their movement and the yoke, which has a matching face to the center post, actually bends the cables to the center post curvatures. Anchor plates 70 are locked to the cables and will move with the arms to be brought ultimately to the anchor plate receiving head 135. Movement of arms 46 to parallelism transversely of the machine will cause the anchor plates to slide into the channel 136 of the head 135 from opposite sides and come into abutment with one another at the center of the head. The cables at this time are doubled around the center post of the dead end header and have their ends anchored in plates 70 held within the jacking shaft head. A slight pull of the jack will tauten the cables to frictionally bind the anchor plates in the head 134. The motor 78 may now be reversed, and, as the air clamps 60 have already been released, the arms may be moved back to their original positions leaving the cables stretched between the headers.

After the arms have resumed their original positions, the pallet from which the headers were lifted will be raised by its elevator to a position between the headers.

The pallet elevator 8 carries vibrator mechanism 162 to vibrate the mold assembly to provide for proper compacting of the concrete during the molding operation. The elevator has a vibrating table 163 which serves as the elevator platform. This table is supported at its corners upon rubber pillars 164, mounted upon a base plate 165. Shock absorbing springs 166 interconnect the vibrating table and base plate. Suitable bearings mount a shaft 167 from the underside of the vibrator table, and shaft 167 carries appropriate eccentric weights 168. A motor 169, mounted on the base plate, drives shaft 167. The base plate is supported upon guide posts 170, slidable in bearings 171 fixed to the machine frame. Fluid cylinders 172 are mounted on the frame at the ends of the elevator and have their rods 173 connected to the base plate. Any suitable vibration isolators 174 may be interposed between the base plate and cylinder assemblies to confine the vibration to the table.

When the cylinders 172 are actuated, the vibrator table will rise, pick up the overlying pallet from its track, and lift it up to the previously elevated headers. The feet 104 of the pallet will contact the header bottoms and limit the upward movement of the pallet. Thus, the limit stops 152 and 160 for the headers will serve as limit stops for the pallet also. When the pallet has been moved into place, the jack may be operated to fully tension the cables as the pull will be between the two headers and the full thrust taken by the pallet. When the jack has been fully operated, the locking clip 141 may be slipped on the shaft 134 of the jack header between the locking shoulder 139 and the header back plate 129. The jack can now be released to let the pallet and header assembly carry the tension load. Due to the fact that the cable is cut to precise lengths, the anchor wedges are fixed known distances from the cable ends, the headers are precisely spaced, and the jacking shaft is moved a predetermined distance and held, the tension applied to the cables can be calculated and will be uniform each time the operation is performed.

With the cables tensioned, the assembly is ready to receive the mold box 7 and proceed with the molding operation. The mold box is a rectangular member having open top and bottom. The side walls 175 will have an internal contour to produce a casting of desired shape. The shape and size of the bottom opening of the box will be such that it will closely fit the raised portion 102 of the pallet so that the two members will interfit to complete a mold chamber 176. The bottom edges of the mold will fit flush upon the upper surface of the peripheral portion 103 of the pallet base casting 101. The ends 177 of the mold box will be slotted from their bottom edges, providing a plurality of cable-receiving slots 178 which extend upwardly to the height the cables will occupy in the mold chamber. This arrangement will allow the mold box to be lowered into position over the cables after tensioning. In order to prevent escape of concrete through the slots 178, the end walls 177 will be recessed in the areas of the slots to provide seats 179 for flexible sheets 180 which will be placed in the recesses and lie flush with the inner wall surfaces of the mold box ends. The slots will have slits 181, coinciding with the center lines of the underlying slots, which slits will terminate at their upper ends in circular openings 182 to accommodate the cables. The openings 182, of course will occupy the positions in the mold wall required by the cable pattern. It will be clear that when the mold box is lowered into place on a pallet, the cables will turn back the flexible sheet at the edges of the slits and permit the box to move downward. When the cables are seated in the openings 182 the flexible sheets will return to their former flat conditions so that the mold walls will present flat inner surfaces.

The mold box is mounted at the molding station, above the molding position, upon suspending guide posts 183 which are slidably mounted in bearings 184 mounted on the frame. One of these posts will be connected to each end of the box. The posts, in turn, are connected to the rods 185 of fluid cylinders 186 suspended from the top of the frame. Vibration isolaters 187 may be interposed between the cylinder rods and the supporting posts to keep vibration from the frame. The movement of the box is a simple vertical one from a raised, inoperative position to a lowered seat upon a pallet. The box has a plate 188 at its top edge, on the side toward the concrete hopper 5, which is beveled for engagement with an oppositely beveled edge of a base plate 189 for the charge box 6. When the mold box is down and the two plates in engagement, a smooth floor is provided for the charge box.

The charge box 6 is a rectangular frame of the length and width of the mold box, mounted for sliding movement across the base plate 189 to and from positions beneath the outlet 190 of the concrete hopper 5 and over the mold box 7. It is moved by means of fluid cylinders 191 which are connected to the frame and have their rods 192 connected to the charge box. Extending rearwardly from the charge box top edge, is a cut-off plate 193 which moves with the box to underlie and close the hopper outlet 190 as the charge box moves from beneath it.

The concrete hopper 5 is of any suitable type, and may be provided with a screw agitator 194 to keep the concrete mixed, in motion and level. A vibrator 195 may also be attached to the hopper. A concrete mixer 196 of desired type may be mounted on top of the machine frame and empty into the hopper 5. Ready mixed concrete, of course, could be brought from some other source if preferred.

Located above the mold box 7 for movement into the box, is a stripper plate 197. This plate is suspended from the machine frame top by a pair of fluid cylinders 198. Operation of the cylinders will raise and lower the stripper plate to and from the mold box.

In the casting of railway ties, it is necessary to make provision for securing rails in place on the ties. In the tie shown, vertical holes 199 are provided to accommodate rail securing means. In order to provide these holes, the pallets have the openings 108 in their bases, arranged in accordance with the desired locations of the holes in the ties. The pallet elevator 8 carries a plurality of elongated core members 200, spaced according to the spacing of the holes 108 in the pallets. Core members 200 are carried by fluid cylinders 201 mounted on the base plate 165 of the elevator, and move through openings 202 in the vibrator table 163. The cylinders will be operated to raise the core members prior to movement of the elevator upward. This will allow the core members to enter the openings 108 in the pallet on the pallet track and accurately position the pallet prior to lifting it.

In order to avoid complication in the disclosure, the air system for supplying the various cylinder assemblies, and the valves for controlling them, have not been shown. It is contemplated that the cylinders will be controlled by conventional solenoid valves, and these, as well as the motors, etc. may be operated by a standard, cylinder type timer having a plurality of switch elements arranged around its surface for closure in desired sequence as the cylinder moves through a cycle of rotation.

In operating the machine, the ingredients for the concrete will be placed in the mixer 196 and when the concrete is mixed it will be flowed into the hopper 5. Reels 23 of cable will be set up on the stand 25 and the cables threaded around the several pulleys 33, 34 and 35, through the feed units 29 and the air clamps 43. The reels will be connected to their motors 27. Supplies of anchor plates 70 are provided in the guide tracks 69, and pallet and header assemblies are placed upon the pallet feed path with one assembly advanced to the elevator position. At this time, the pallet and header elevators are down, the mold box and stripper are raised, and the charge box is beneath the hopper outlet receiving a charge of concrete. The jack 11 is in its released position. The machine is now ready to begin its cycle of operation.

As the cycle begins, the air clamps 43 on the feed platform will release and the motors 27 and 32 be started. Clamps 60 on the arms 46 will already be in open position. As the motors start, the ends of the cables will be fed forward through the holes 71 in the anchor plate 70 positioned against the stop pin 72 on track 69 adjacent the feeding platform. As the cable ends emerge from the opposite side of the anchor plate, they enter the cable channels 57 in the adjacent arm 46. Further feeding of the cables causes them to traverse the lengths of the two arms and thread through the holes in an anchor plate 70 at the far end of the machine. The ends will then strike limit switch 73, stopping motors 27 and 32, applying air clamps 43 and 60 and causing the saw 44 to advance to cut the cables between the clamps 43 and the adjacent anchor plate.

Precise lengths of cable are now clamped upon the arms with the opposite ends of the cables threaded through anchor plates. Motor 78 will be started at this time to to rotate shaft 50 to cause the follower nut 76 to advance along the shaft and actuate the arms. At the same time, stop pins 72 are retracted to free the end anchor plates for movement along the tracks. As previously described, the stiffness of the cables spanning yoke 48 will hold the arms 46 against pivotal movement so the entire assembly will move bodily toward the center of the machine, the cables serving also to draw the anchor plates along with the arms. This translating movement is of short duration, being only sufficient to bring the cable ends to the splaying mechanisms 74.

When the cable ends move into the splaying mechanism, they are traveling in a horizontal plane and will pass on opposite sides of the fixed jaws of the air clamps 79 in approximately the positions shown in dotted lines in FIGURE 15. When the clamps are actuated, the cable ends will be deflected to seat in the curved fixed jaws in axial alignment with the tubes 83 upon which the jaws are mounted. The cable ends are now tightly gripped at spaced points by the clamps 60 on the arms and clamps 79 on the splaying mechanisms. Cylinders 92 will swing arms 91 causing rotative movement of clamps 79 in a direction tending to tighten the twist of the outer strands about the central strand of the cable. This will cause the outer strands to ride up upon one another and spread outward in inverted cone fashion. While the strands are held in this condition, the wedge inserters 96 will operate to push wedges from the wedge troughs 94 into the open ends of the cables. When cylinders 92 reverse, the rotative movement of clamps 79 is reversed and the spread ends of the cables retract, tightly binding upon the wedges. With the wedges in place, the anchor plates are locked on the cable ends.

During the cable feeding and anchoring stages of operation, the header elevators 9 and 10 will operate to lift the headers 99 and 100 from the pallet at the molding station. These elevators will operate simultaneously and in the same manner. The platform of each will move up between the feet 104 of the pallet and engage the underside of its respective header. The grooves in the platforms will seat upon the positioning ribs of the headers and if the headers are out of proper vertical alignment will cause them to come into position. The headers will be held properly aligned during the entire upward movement. The headers will be stopped at the proper level by contact with the stops 152 and 160. The headers will remain in this position, clamped between their elevator platforms and limit stop members.

As soon as the plates 70 are anchored, the air clamps 79 will release and the cable ends will spring back to their former positions free of the jaws 85, and in position to move horizontally from the splaying mechanisms. Motor 78 will start again and the arm assembly will move inward. This movement will be arrested almost immediately, however, as the cables will strike the center post of the dead end header 99. As shaft 50 continues to rotate the arms will be caused to swing about their pivotal connections with the yoke 48 and bend the cables around the center post of the header. The arms will move freely, supported at their outer ends by casters 56 riding upon the track sections 53 and 54. This movement is continued until the arms are extending transversely across the machine parallel to one another. The wrapping of the cables around the center post of the dead end header will tighten the cables to the extent that the spread ends will seat in the conical openings in the anchor plate and the plates will be pulled up against the ends of the arms. Thus, the plates will reach the end of their arcuate swing in precise position to slip easily into the ends of the channel 136 in the anchor plate receiving head 175 on the jacking shaft of the jack header.

When the anchor plates are seated, the jack 11, which was engaged by the jacking shaft foot 140 entering the T-slot in the jack clevis 144 when the header was raised to position, will be jogged slightly to place the cable pull between the dead end header and the anchor plates and relieve the arms. Motor 78 will now be reversed, the air clamps 60 will already be released, and the arms may move freely back to their initial positions. As they start back, the cables moving out of the channels in the arms will open the channel covers 58 against the action of their springs so that the cables can move out freely.

While the cables are held under relatively light tension, the pallet will be raised into position between the headers. Before lifting contact is made between the elevator and pallet, the core members 200 will be raised to project through the openings 108 in the pallet. The tapered pins entering the holes will align the pallet and hold it in proper position during lifting. The upward travel of its elevator will be stopped when the feet 104 of the pallet come to rest against the undersides of the previously positioned headers. As the rigid pallet with channel construction and tubular bearing posts is now intermediate the headers to take the full tensioning strain, the jack will be operated to apply full stretch. A locking key 141 is then dropped into place between the shoulder 139 on the jacking shaft and the back plate of the header. The jack will then be released and the entire tension pull will be between the two headers, with the headers bridging the legs of the U-shaped end plates of the pallet and the pallet serving as the restraining member to maintain the header spacing and the cable tension.

The cables are now tensioned and the mold box is lowered onto the pallet. The box will seat upon the pallet nesting snugly around the raised central portion. As soon as the box is in place, the charge box, fully loaded with concrete, will move over the base plate 189 from beneath the hopper to a position over the mold box. As the charge box moves from beneath the hopper, the cut-off plate slides across the hopper mouth to close it. When the charge box overlies the mold box the concrete will drop into the mold box filling the mold cavity. The vibrating mechanism is in operation at this time to settle the concrete solidly in the mold box. The charge box is moved back beneath the hopper to receive a fresh charge, and the stripper plate is moved down on the concrete in the mold box to press it into place while it is being vibrated. As a dry mix is used, the stripper may be raised quickly and the mold box lifted, leaving the molded member on the pallet with the cables held under full tension.

At any time following the tension of the cables, the header elevator may be lowered as the headers will be upon the projecting feet of the pallet and tightly bound to the pallet end plates by the tensioned cables. As soon as the molding is completed and the mold box raised, the pallet elevator is lowered, bringing the loaded pallet down to rest upon the pallet rails. Forward movement of the pallet advancing mechanism will move the loaded pallet from the molding station to the ejecting position, and move another pallet and header assembly to the molding station. The loaded pallet may be taken from the ejecting position in any desired manner and transported to a curing location. The molded member may stay on the pallet with the cables tensioned for any time period necessary for curing. After curing, the cables may be cut adjacent the headers and the stressed member removed from the pallet leaving the pallet and headers available for reuse.

The above described cycle of operation up to the moving of the loaded pallet to the ejecting position is repeated in continuous manner, as fast as the cables can be laid and tensioned, the mold box placed, the concrete poured, and the loaded pallet removed from the molding station. Thus, a continuous process is established. The fact that the pallet and header assembly provide a self-sustaining means for supporting a molded member and maintaining cable tension, only one mold box, jack, etc. are necessary, and these are not tied up for long periods of time with one molding operation but are free for repeated and continuous cyclic operation.

While in the above, one practical embodiment of the invention has been disclosed, it will be understood that the specific details of construction shown and described are merely by way of example, and the invention may take other forms within the scope of the appended claims.

What is claimed is:

1. A machine for making pre-stressed concrete members comprising, a frame having a transversely extending molding position thereon, a mold box mounted transversely of the frame adjacent the molding position and movable vertically to and from the molding position, a pallet feed path extending longitudinally of the frame and across the vertical transverse plane of the molding position, a supply of pallets of channel-shaped transverse cross-section having a header at each end bridging the channel-shaped pallet with at least one of the headers being unattached to the pallet, means to move assembled pallets along the feed path to and through the molding position, means to string tensioning cables between the headers of the pallets, means on the headers to engage the cables to prevent release of the cables from the headers when the headers are moved apart, means on the frame to engage the unattached header of a pallet to separate the cable engaging means of the headers to tension cables strung between the headers, and means on the unattached header to hold the cable engaging means in cable tensioned position, means to move the mold box to pallet-contacting cable-surrounding position to form a mold cavity at the molding position, and means to feed concrete mix to the mold cavity.

2. A machine for making pre-stressed concrete members as claimed in claim 1 wherein the means to engage the unattached header to tension the strung cables is a hydraulic jack extendable transversely of the frame.

3. In a machine for making pre-stressed concrete members, a frame having a horizontal molding position extending transversely thereof, a mold box carried by the frame above the molding position and movable vertically to and from the molding position, a source of supply of pallets, means to move pallets from the source of supply to and through the molding position, a pair of cable-receiving arms pivotally joined together and mounted to lie longitudinally of the frame in aligned continuation of one another at one end of the molding position with the arms projecting symmetrically on opposite sides of the molding position, means to swing the arms horizontally about their pivotal connection to place the arms parallel to one another and extending longitudinally across the molding position, means forming a post carried by each pallet at one end thereof and movable vertically independently of the pallet to the molding position, the means forming a post being adjacent the pivotal connection of the arms when at the molding position, the post forming an abutment about which cable held by the cable-receiving arms will be bent when the arms are moved to extend across the molding position, means carried by the pallet at the opposite end of the molding position from the pivotal arm connection and movable vertically independently of the pallet to the molding position and cooperable with means on the frame to engage the ends of stressing cable on the arms and tension the cable bent about the post-forming means, and means to elevate the pallet to the molding position between the respective means carried at the ends thereof.

4. In a machine for making pre-stressed concrete members as claimed in claim 3, a source of supply of stressing cable, means to feed cable from the source of supply endwise to the cable-receiving arms while the arms lie in continuation of one another longitudinally of the frame, and means to cut off lengths of cable so fed from the source of supply intermediate the cable feeding means and the end of the cable receiving arms adjacent the cable feeding means.

5. In a machine for making pre-stressed concrete members as claimed in claim 4, means on the arms to clamp the stressing cables, and means adjacent the feeding means to clamp the cut cable end from the source of supply.

6. In a machine for making pre-stressed concrete members as claimed in claim 3, means adjacent the free ends of the pivoted arms when in longitudinal continuation of one another to support anchor plates having cable anchoring openings therein.

7. In a machine for making pre-stressed concrete members as claimed in claim 6, a source of supply of stressing cable adjacent one end of the arms when in longitudinal alignment, means to feed cable endwise from the source of supply through the opening in an anchor plate in the anchor plate supporting means adjacent the feed, onto the arms and through the opening in an anchor plate in the other anchor plate supporting means, and means to cut the cable intermediate the feed means and anchor supporting means adjacent thereto.

8. In a machine for making pre-stressed concrete members as claimed in claim 7, means adjacent each anchor plate supporting means to enlarge the ends of cable through the anchor plates to anchor the cable to the plate.

9. A machine for making pre-stressed concrete members comprising, a frame having a molding position thereon, a mold box carried by the frame above the molding position and movable vertically to and from the molding position, a pallet feed path on the frame below the molding position, pallet assemblies, means to advance pallet assemblies along the pallet feed path to locations beneath and beyond the molding position, each pallet assembly comprising a rigid pallet and a pair of headers, the pallet having upstanding supports at each corner and the headers adapted each to bridge a pair of the supports at one end, means mounted on the frame beneath the molding position to lift the headers of the pallet assemblies from the pallet feed path to the molding position, means to string stressing cable between the headers and connect the cables to the headers, means mounted on the frame and to hold one of the headers against movement, means connectable to the other of said headers to tension the strung cables between the headers to move that header away from the header held against movement, and means to raise the pallet into position between the headers to hold the headers separated and the cable under tension.

10. A machine for making pre-stressed concrete members as claimed in claim 9, wherein one of said headers has means forming a post and the other includes a coupler, said means to string cable including means to receive lengths of stressing cable and means to bend the center of the cable length about the post means of the one header and engage the ends of the cable in the coupler of the other header.

11. A machine for making pre-stressed concrete members as claimed in claim 9, wherein one of said headers has means forming a post and the other includes a coupler, said means to string cable including, a pair of cable-receiving arms pivotally joined together and mounted to lie longitudinally of the frame in aligned continuation of one another at one side of the molding position with the arms projecting symmetrically on opposite sides of the post means of the header at the molding station, means to feed cable to the arms while in aligned position, means to swing the arms about their pivotal connection to bend the cable about the post means of the one header and engage the ends of the cable in the coupler means of the other header.

12. A machine for making pre-stressed concrete members as claimed in claim 11, wherein there are means at the ends of the arms when in aligned position to hold anchor plates having cable openings to receive the ends of cables fed to the arms, and means to secure the cable ends to the anchor plates.

13. A machine for making pre-stressed concrete members as claimed in claim 12, wherein the stressing cable is a multi-strand cable, and said means to secure the cable ends to the anchor plates include, means to separate the strands of the cable, and means to insert anchoring wedges in the cable between the separated strands to enlarge the cable end.

14. A machine for making pre-stressed concrete members comprising, a frame having a molding position arranged transversely thereof, a mold box carried by the frame above the molding position and movable vertically to and from the molding position, a pair of stressing cable-receiving arms pivotally joined together and mounted to lie longitudinally of the frame in aligned continuation of one another at one end of the molding position with the arms projecting symmetrically on opposite sides of the molding position, a source of supply of stressing cable, means to feed the cable from the source of supply endwise to the cable-receiving arms while the arms are longitudinally aligned, said frame having a pallet path thereon below the molding position, a supply of pallet assemblies each comprising a rigid pallet and a pair of headers, each pallet having upstanding supports at each corner and the headers adapted each to bridge a pair of the supports at one end, means to advance pallet assemblies along the pallet path to locations beneath and beyond the molding position, means mounted on the frame beneath the molding position and pallet path to lift headers from the feed path to the molding position, the header adjacent the cable-receiving arms having means forming a post and the other header including a coupler, means to swing the arms about their pivotal connection to bend cable thereon about the post forming means of the one header and engage the free ends of the cable with the coupler of the other header, means carried by the frame to hold the header to separate the headers having the post forming means immovable, means connectible to the other header to tension cable between the headers, and means to lift a pallet from the feed path into position between the headers to hold the headers separated and the cables under tension.

15. A machine for making pre-stressed concrete members as claimed in claim 14, wherein there are means to move the mold box vertically to the molding position in surrounding relation with cable between the headers and into association with a raised pallet to form a mold cavity traversed by the tensioned cable.

16. A machine for making pre-stressed concrete members as claimed in claim 15, wherein there are means to support anchor plates having cable-receiving openings therein at the ends of the cable-receiving arms in alignment with the cable feed so that cable will be threaded through the anchor plates while being fed to the arms, means intermediate the cable feeding means and the cable receiving arms to cut the cable to required length, the cable being multi-strand cable, means to separate the strands, and means to insert wedge anchors in the separated strand ends to enlarge the cable ends to lock them to the anchor plates.

References Cited in the file of this patent

UNITED STATES PATENTS

| 1,425,015 | Hyten | Aug. 8, 1922 |
| 1,429,459 | Schol | Sept. 19, 1922 |
| 1,486,056 | Straub | Mar. 4, 1924 |
| 1,632,286 | Graham | June 14, 1927 |
| 1,796,636 | Toulmin | Mar. 17, 1931 |
| 2,237,618 | Weatherford | Apr. 8, 1941 |
| 2,266,357 | Cooke | Dec. 16, 1941 |
| 2,394,228 | Barber et al. | Feb. 5, 1946 |
| 2,437,003 | Ruegg | Mar. 2, 1948 |
| 2,496,016 | Nelson | Jan. 31, 1950 |
| 2,556,928 | Ludow | June 12, 1951 |
| 2,566,848 | Morton | Sept. 4, 1951 |
| 2,569,231 | Danhof | Sept. 25, 1951 |
| 2,578,620 | Wilhelm | Dec. 11, 1951 |
| 2,590,478 | Weinberg | Mar. 25, 1952 |
| 2,686,963 | Freyssinet | Aug. 24, 1954 |
| 2,689,999 | Peterson | Sept. 28, 1954 |
| 2,745,164 | Ros | May 15, 1956 |
| 2,778,088 | Sterrett | Jan. 22, 1957 |
| 2,787,042 | Brequet | Apr. 2, 1957 |
| 2,835,016 | Dixon | May 20, 1958 |

FOREIGN PATENTS

| 784,184 | Great Britain | Oct. 2, 1957 |
| 1,047,098 | Germany | Dec. 18, 1958 |